United States Patent
Tsukiyama et al.

(10) Patent No.: US 6,684,375 B2
(45) Date of Patent: Jan. 27, 2004

(54) DELAY DISTRIBUTION CALCULATION METHOD, CIRCUIT EVALUATION METHOD AND FALSE PATH EXTRACTION METHOD

(75) Inventors: Shuji Tsukiyama, Tokyo (JP); Masakazu Tanaka, Kyoto (JP); Masahiro Fukui, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 8 days.

(21) Appl. No.: 09/988,602

(22) Filed: Nov. 20, 2001

(65) Prior Publication Data

US 2002/0104065 A1 Aug. 1, 2002

(30) Foreign Application Priority Data

Nov. 22, 2000 (JP) .......... 2000-355417
Nov. 28, 2000 (JP) .......... 2000-360629
Jan. 9, 2001 (JP) .......... 2001-001075

(51) Int. Cl.[7] .............. G06F 17/50
(52) U.S. Cl. .......... 716/6; 716/1; 716/5; 716/2; 716/3
(58) Field of Search .............. 716/6, 1–5, 7

(56) References Cited

U.S. PATENT DOCUMENTS

| | | | | |
|---|---|---|---|---|
| 5,508,937 A | * | 4/1996 | Abato et al. .......... | 716/6 |
| 5,636,372 A | * | 6/1997 | Hathaway et al. .......... | 713/500 |
| 5,768,130 A | * | 6/1998 | Lai .......... | 703/19 |
| 5,847,966 A | * | 12/1998 | Uchino et al. .......... | 716/2 |
| 6,304,836 B1 | * | 10/2001 | Krivokapic et al. .......... | 703/14 |

OTHER PUBLICATIONS

Choi, B, et al "Timing Analysis of Combinatational Circuits Including Capacitive Coupling and Statistical Process Variation", VLSI Test Symposium, 2000, Proceedings, IEEE)Apr. 30, 2000—May 4, 2000, pp. 49–54.*

Tongsima, S et al,"Optimizing Circuits with Confidence Probability using Probabilistic Retiming", Circuits and Systems, 1998, ISCAS '98. Proceeding, May 31, 1998–Jun. 3, 1998 pp. 270–273.*

Jyu, H.F., et al, "Statistical Timing Analysis of Combinational Logic Circuits", IEEE Trans. VLSI Systems, vol. 1, No. 2, pp. 126–137. 1993.*

Shuji Nishimoto et al., "A Performance Test of the Statistical Static Timing Analyzer Considering Correlations Between Delays", The Institute of Electronics, Information and Communication Engineers, Mar. 2001, (Partial English Translation therof).

U.S. patent application Ser. No. 09/793,564, filed Feb. 27, 2001, (Our Ref. No. 60188–039).

* cited by examiner

Primary Examiner—Matthew Smith
Assistant Examiner—Magid Y Dimyan
(74) Attorney, Agent, or Firm—McDermott, Will & Emery

(57) ABSTRACT

Delay distribution in an integrated circuit is calculated while taking into account a correlation of performance between interconnects or elements in the integrated circuit, thereby improving estimation accuracy. Circuit information, performance distribution information of the interconnects or elements in the integrated circuit, and correlation information of performance between the interconnects or elements are input. A vertex is selected for calculation, and a correlation between delay distribution at the selected vertex and delay distribution in a partial circuit including the selected vertex is calculated based on the performance distribution information and the correlation information.

7 Claims, 9 Drawing Sheets

DELAY DISTRIBUTION CALCULATION METHOD, CIRCUIT EVALUATION METHOD AND FALSE PATH EXTRACTION METHOD

BACKGROUND OF THE INVENTION

The present invention generally relates to technology of evaluating performance of an integrated circuit such as CMOS (Complementary Metal-Oxide Semiconductor) and LSI (Large Scale Integration) in its design. More particularly, the present invention relates to technology of calculation of delay distribution, and removal and extraction of false paths.

In the VLSI (Very Large Scale Integration) design in deep sub-micron era, it is necessary to take variation in manufacturing process into account in advance so that circuits with required performance are produced with high yield. Like the technology such as OPC (Optical Proximity Correction), variation control by mask shape correction has become possible, and is increasingly required in practical applications. Therefore, the future VLSI physical design requires technology of designing a highly integrated, high performance circuit by setting proper design margins for each transistor in view of the manufacturing variation.

A method for estimating variation in circuit performance such as critical path delay resulting from manufacturing variation is essential to such design technology. Since the distribution of critical path delay is independent of input, statistical static timing analysis can be used as a method for estimating variation in critical path delay.

One method for statistical static timing analysis is to estimate the maximum delay on the assumption that variations in signal transmission time do not have a correlation (disclosed in M. Hashimoto and H. Onodera, "A performance optimization method by gate resizing based on statistical static timing analysis," Proc. Workshop on Synthesis And System Integration of Mixed Technology (SASIMI 2000), pp. 77–82, 2000).

On the other hand, one method for static timing analysis of a combinational circuit formed from CMOS logic gates is as follows: a given circuit 100 as shown in FIG. 9 is represented by an acyclic graph G=(V, E) 200 as shown in FIG. 10, and in this graph G 200, the maximum delay required to propagate a value "0" or "1" is obtained for each output terminal v.

In FIG. 10, each dashed ellipse 210 corresponds to a primary input terminal and a primary output terminal of the circuit and input/output terminals of a logic gate. A white circle 211 and a black circle 212 in an ellipse 210 corresponding to a terminal v are 0-vertex v0 and 1-vertex v0 of v, respectively, where v0 and v1 indicate that the corresponding terminal v has signal values "0" and "1", respectively.

Moreover, S indicates a set of sources into which no edge comes, and T is a set of sinks from which no edge goes out. The sources correspond to the primary input terminals, and the sinks correspond to the primary output terminals. Each directed path from a source to a sink in the graph G is referred to as a path. Although the direction of each edge is not shown in FIG. 10, every edge is a directed edge going out from a left vertex and coming into a right vertex.

In FIG. 10, each box 221, 222, 223 represents a logic gate in the circuit 100. The left vertices in each box correspond to the input terminals of the corresponding logic gate, and the right vertices in each box correspond to the output terminal of the corresponding logic gate. Each edge in the box goes out from a vertex representing input of the corresponding logic gate into a vertex representing output thereof. In the case where the box represents a NAND gate or a NOR gate, each edge in the box corresponds to PMOS or nMOS in the corresponding gate. The way to generate the edges is determined according to the type of logic gate. Each edge connecting vertices in different boxes corresponds to an interconnect, and edge e0 going out from 0-vertex of a terminal reaches 0-vertex of another terminal, and edge e1 going out from 1-vertex of a terminal reaches 1-vertex of another terminal.

The true maximum delay required to propagate a value "0" to a terminal v is herein denoted by d0(v), and the true maximum delay required to propagate a value "1" is herein denoted by d(1). Herein, d0(v), d1(v) for each terminal v of the circuit are represented by the longest path lengths d(v0), d(v1) from a sink to v0, v1 on the graph G, respectively. Therefore, the delay required to transmit a signal value from a terminal v to a terminal w is assigned to each edge e=(v, w) as a weight t(e).

Simulation using such an acyclic graph made it possible to conduct timing analysis of a logic circuit by a relatively simple process.

In delay calculation of a signal z in the circuit 100 as shown in FIG. 9, however, if the delays of signals x and y heavily depend on the delay of a signal b, there is a significant correlation between the delays of the signals x and y. If there is variation in interconnect delay, there is also a correlation between the signal transmission delays of fanout of the signal b. Accordingly, the statistical analysis that does not take correlation into account is likely to be inaccurate.

When delay distribution estimation has poor accuracy, it must be ensured that an integrated circuit will operate in a normal condition even under a plurality of worst conditions which are not likely to occur simultaneously in actual situations, resulting in design including excessive margins. This unnecessarily increases the area and costs such as power consumption in the designed integrated circuit.

The conventional methods have additional problems.

The conventional methods include paths that cannot be simulated actually (false paths). This results in excessively increased calculation time, degraded accuracy in delay estimation, and the like.

The false paths can be divided into two types: logical false paths and functional false paths. A logical false path is a path that will not be activated actually since there is no input for logically propagating a signal to that path. A functional false path is a path that will not be activated since there is an input for activating that path but such an input will not be produced actually. For example, in FIG. 11, among the paths passing through two AND gates G1, G6 controlled by complementary signals z,/z, such a path that the input x of the AND gate G1 other than the input z becomes "1" and the output y of the AND gate G6 becomes "1" corresponds to a logical false path. For example, when operation by a series of operating units (X, M, Y) and a series of operating units (A, M, B) is required, the use of a common multiplier M would result in a series of operating units (A, M, Y) or (X, M, B). However, if the specification does not allow simultaneous operation of the operating units, these series of operating units correspond to functional false paths.

It is practically impossible for human beings to find logical false paths in view of the large circuit scale. Therefore, an automatic finding method using a computer is essential.

SUMMARY OF THE INVENTION

It is an object of the present invention to provide a method for calculating delay distribution of an integrated circuit, which is capable of calculating delay distribution more accurately according to an actual circuit.

It is another object of the present invention to provide an integrated circuit evaluation method having improved evaluation accuracy while avoiding effects of a false path. The present invention also proposes a method for extracting a false path from an integrated circuit to be designed.

More specifically, according to the present invention, in a method for calculating delay distribution in an integrated circuit to be designed, the delay distribution is calculated based on correlation information indicating a correlation of performance between interconnects or elements that are included in the integrated circuit.

According to the present invention, the delay distribution of the integrated circuit is calculated based on correlation information indicating a correlation of performance between the interconnects and elements that are included in the integrated circuit. This enables the delay distribution of the integrated circuit to be calculated with improved accuracy.

Preferably, the delay distribution calculation method according to the present invention includes the steps of: generating a graph representing the integrated circuit based on circuit information indicating connection between elements in the integrated circuit; and calculating delay distribution of each vertex in the graph by using performance distribution information and the correlation information. The performance distribution information indicates performance distribution of the interconnects and the elements that are included in the integrated circuit.

Preferably, the calculation step includes a first step of selecting from the graph a vertex that does not belong to a set of vertices whose delay distribution has been calculated as a vertex for calculation, and a second step of calculating for the vertex selected in the first step the delay distribution and a correlation of performance with each vertex belonging to the set, based on the performance distribution information and the correlation information, and the first and second steps are repeatedly conducted while adding to the set the vertex whose delay distribution has been calculated.

Preferably, the delay distribution calculation method according to the present invention includes the step of producing the correlation information based on layout of the integrated circuit by using correlation characteristics information. The correlation characteristics information indicates a relation between the correlation of performance between the interconnects or the elements and layout characteristics.

According to the present invention, a method for evaluating an integrated circuit to be designed includes: a first step of producing an equivalent circuit that does not include a signal transmission path corresponding to a false path, based on circuit information indicating connection between components in the integrated circuit; and a second step of evaluating the integrated circuit by using the equivalent circuit produced in the first step.

According to the present invention, evaluation can be conducted by using the equivalent circuit including no false path, allowing for rapid, accurate evaluation of performance of the integrated circuit.

Preferably, in the circuit evaluation method according to the present invention, false path information indicating the false path is used, and the false path information represents the false path by two vertices on a graph representing the integrated circuit.

Preferably, the first step includes the steps of extracting a first partial circuit provided with a first vertex as an input and a second vertex as an output, the first vertex and the second vertex being two vertices representing the false path, making a copy of the first partial circuit as a second partial circuit, and modifying connection of the first and second partial circuits and another circuit such that there exists no path from the first vertex toward the second vertex.

According to the present invention, in a method for extracting a false path in an integrated circuit to be designed, the false path is extracted using an activating condition of a non-control signal edge within each logic gate included in the integrated circuit.

Preferably, the false path extraction method according to the present invention includes the steps of: propagating a logic value listed in the activating condition of a non-control signal edge within a first gate by a propagation process; conducting repeatedly the propagation step while the value to be propagated is a control signal; and detecting a path from the first gate to a second gate as the false path when the propagated value is inconsistent with the activating condition of a non-control signal edge within the second gate.

DETAILED DESCRIPTION OF THE INVENTION

FIRST EMBODIMENT

A method for calculating distribution of the maximum delay value for each terminal v of a circuit will be described in the first embodiment of the present invention. In the following description, d0(v) denotes the true maximum delay required to propagate a value "0" to a terminal v, and d1(v) denotes the true maximum delay required to propagate a value "1" to a terminal v.

Figure 10:
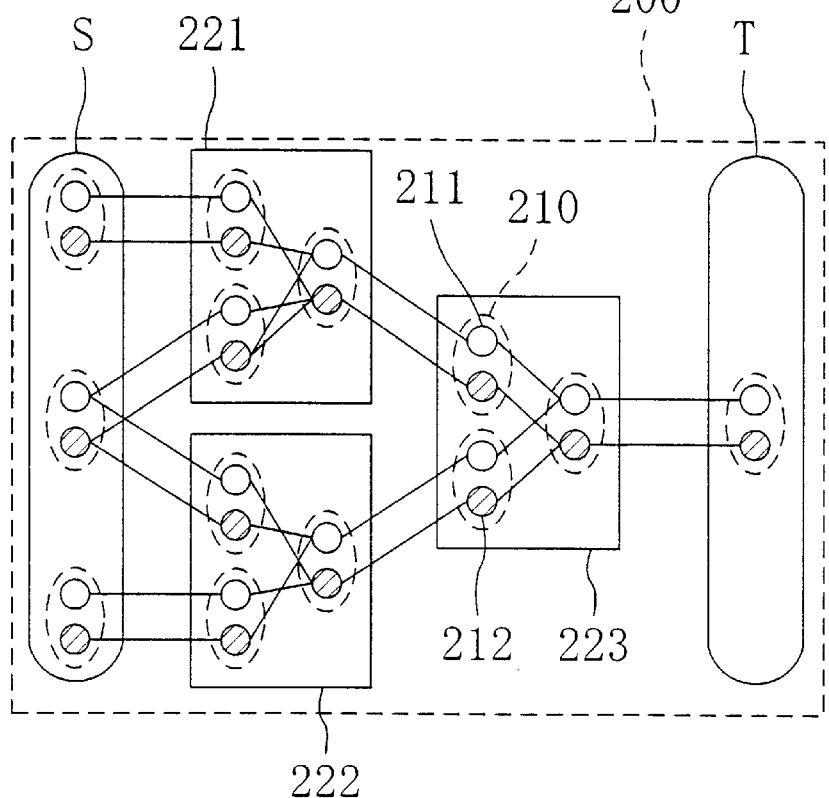
FIG. 10 shows an acyclic graph representing the circuit of FIG. 9.

First, a given circuit is represented by an acyclic graph G=(V, E) as shown in FIG. 10. For each edge e=(v, w), delay (weight of the edge e) t(e) required to transmit a signal value from a terminal v to a terminal w is regarded as a stochastic variable, and has a normal distribution $N(\mu, \sigma^2)$ The mean $\mu$ and variance $\sigma^2$ of the delay t(e) are respectively denoted by $\mu(e)$ and $\sigma(e)$. In other words, probability density function f(t(e)) of the delay t(e) is given by the following equation:

$$f(t(e)) = \frac{1}{\sqrt{2\pi}\,\sigma(e)} \exp\left[\frac{-(t(e)-\mu(e))^2}{2\sigma^2(e)}\right]. \quad (1)$$

The delay t(e) of an edge e corresponding to an interconnect will now be described. It is herein assumed that the interconnect delay t(e) has variation with a normal distribution.

When an edge corresponding to an interconnect is an edge e0=(v0, w0) connecting 0-vertices of vertices v and w, there exists an edge e1=(v1, w1) connecting 1-vertices of the vertices v and w. However, variations of delay t(e1) of the edge e1 and delay t(e0) of the edge e0 are not independent of each other. Moreover, when two or more edges e'=(v, w'), e"=(v, w") go out from a vertex v (that is, when a net has fanout), variations of delays t(e'), t(e") of the edges e', e" are not independent of each other, either. For such a set of edges (e', e") in the same net, a correlation coefficient r(e', e")≠0 is introduced. The delay of an edge e' corresponding to an interconnect is independent of the delay of an edge corresponding to an interconnect of a different net or an edge e" that does not correspond to an interconnect (i.e., that is included in a logic gate), so that the correlation coefficient r(e', e")=0.

Hereinafter, the edges corresponding to a logic gate and the delays thereof will be described. The way to generate the edges in order to represent the maximum delay required to propagate "0" or "1" to an output terminal w of the logic gate by the longest path length d(w0), d(w1) to 0-vertex w0 or 1-vertex w1 of a vertex w on the graph G will now be considered.

First, it is assumed that the logic gate is an AND gate, and the AND gate has an input terminal $v_i$ (1. i . k) and an output terminal w. The delay d(w1) required to set the output w to "1", corresponds to the time after all inputs $v_i$ become "1". Therefore, the delay d(w1) is calculated by $$d(w1)=max[d(v_i1)+t(e_i1)|1\leq i\leq k] \quad (2)$$

under the condition that all inputs $v_i$ are "1". Therefore, for each input $v_i$ is generated an edge $e_i1=(v_i1, w1)$ from 1-vertex $v_i1$ of the input $v_i$ to 1-vertex w1 of w. The delay $t(e_i1)$ of the edge $e_i1$ corresponds to the time required for the output w to become "1" after the input $v_i$ becomes "1".

On the other hand, the delay d(w0) required to set the output w of the AND gate to "0" is determined by the time required for a single input to become "0". Accordingly, when every input $v_j$ other than $v_i$ (j≠i; 1. j . k) is "0" and $d(v_i0)+t(e_i0)\cdot d(v_j0)+t(e_j0)$, $d(w0)=d(v_i0)+t(e_i0)$.

Therefore, d(w0) seems to be given by $$d(w0)=min[d(v_i0)+t(e_i0)|1\leq i\leq k] \quad (3)$$

However, even when every input $v_j$ other than $v_i$ is "1", $d(w0)=d(v_i0)+t(e_i0)$. Therefore, provided that every input $v_j$ other than $v_i$ is "1" for 1. j . k, the maximum delay d(w0) required to set w to "0" is given by the following equation:

$$d(w0)=max[d(v_i0)+t(e_i0)|1\leq i\leq k] \quad (4)$$

Therefore, for each input $v_i$ is generated an edge $e_i0=(v_i0, w0)$ from 0-vertex $v_i0$ of the input $v_i$ to 0-vertex of the output w. The delay $d(e_i0)$ of the edge $e_i0$ corresponds to the time required for the output w to become "0" after the input $v_i$ becomes "0".

Thus adding the edges within the AND gate and determining the delays thereof enables the delays d(w1), d(w0) to be calculated by the maximum operation.

Hereinafter, specific description will be given for the case where the logic gate is a NAND gate. In this case, the expressions for setting the output w to "1" and for setting the output w to "0" need only be switched each other in the above equations (2), (4). Therefore, the delays d(w1), d(w0) can be calculated by the following equations:

$$d(w1)=max[d(v_i0)+t(e_i0)|1\leq i\leq k] \quad (5)$$

$$d(w0)=max[d(v_i1)+t(e_i1)|1\leq i\leq k] \quad (6)$$

Accordingly, for each input $v_i$ are generated an edge $e_i0=(v_i0, w1)$ from 0-vertex $v_i0$ of the input $v_i$ to 1-vertex w1 of the output w, and an edge $e_i1=(v_i1, w0)$ from 1-vertex $v_i1$ of the input $v_i$ to 0-vertex w0 of the output w. The delay $t(e_i0)$ of the edge $e_i0$ corresponds to the time required for the output w to become "1" after the input vi becomes "0", and the delay $t(e_i1)$ of the edge $e_i1$ corresponds to the time required for the output w to become "0" after the input $v_i$ becomes "1". In the case where the logic gate is an inverter, k=1.

From the same discussion, in the case where the logic gate is an OR (or NOR) gate as well, d(w0) (d(w1) in the case of the NOR gate) and d(w1) (d(w0) in the case of the NOR gate) can be calculated by the following equations:

$$d(w0)=max[d(v_i0)+t(e_i0)|1\leq i\leq k] \quad (7)$$

$$d(w1)=max[d(v_i1)+t(e_i1)|1\leq i\leq k] \quad (8)$$

Accordingly, the edges are generated for the OR gate in the same manner as that for the AND gate, and are generated for the NOR gate in the same manner as that for the NAND gate. In the case of a CMOS composite gate as well, the edges are generated in the same manner as that for the NAND (NOR) gate.

In the case of an XOR gate, however, a value "0" of the input $v_i$ may set the output w to either a value "0" or "1". Moreover, a value "1" of the input vi may set the output w to either a value "0" or "11". Therefore, for each input $v_i$ are generated an edge $e_i00=(v_i0, w0)$ from 0-vertex $v_i0$ of the input $v_i$ to 0-vertex $w_0$ of the output w, an edge $e_i01=(v_i0, w1)$ from 0-vertex $v_i0$ of the input w, an edge $e_i01=(v_i0,$ output w, an edge $e_i10=(v_i1, w0)$ from 1-vertex $v_i1$ of the input $v_i$ to 0-vertex w0 of the output w, and an edge $e_i11=(v_i1, w1)$ from 1-vertex $v_i1$ of the input $v_i$ to 1-vertex w1 of the output w. The delay $t(e_ibb)$ of each edge eibb' ($v_ib$, wb') corresponds to the time required for the output w to become b' after the input $v_i$ becomes b, where b and b' indicate either "0" or "1".

By thus generating the edges within the logic gate, the longest path length to each sink obtained in the acyclic graph G=(V, E) is a candidate for critical path delay.

Hereinafter, variation in delay in the logic gate will be described.

In the case of a NAND gate, NOR gate or CMOS composite gate, the delays $t(e_i0)$ and $t(e_i1)$ of the edges correspond to switching delays of pMOS and nMOS to which the input $v_i$ of the gate is connected. Such a switching delay is the time during which a transistor is in a saturation region, and is determined by a saturation drain current $I_{dsat}$, load capacitance C to be driven, slew rate of the gate voltage, and the like. The saturation drain current $I_{dsat}$ has variation, which mostly depends on variation in the gate length L. Like a threshold voltage $V_{th}$, the variation in the gate length L is approximately modeled by normal distribution. Therefore, the switching delay $t(e_ib)$ is also modeled by normal distribution $N(\mu, \sigma^2)$.

Variation in the gate length L is affected by the spacing P between adjacent polysilicon gates, the transistor gate width W, the length $L_{DIF}$ of a diffusion region, and the like. Accordingly, by finding the relation between these values and variation in the gate length L, the spacing P, gate width W and diffusion region length $L_{DIF}$ can be obtained from the layout pattern. As a result, variation in the gate length L can be predicted, and hence variation in the switching delay can be estimated.

Such variation in the delay is affected by the spacing between adjacent polysilicon gates. Thus, variations of the delays of the edges corresponding to adjacent transistors are not independent of each other. Therefore, for a set of edges (e', e") included in the same logic gate, a correlation coefficient r(e', e")≠0 is introduced. Such a correlation is considered for the logic gates other than the NAND gate and the NOR gate. When there is no correlation, correlation coefficient r(e', e")=0.

Since only the edges included in the same logic gate have a correlation, delays of the edges e', e" included in different gates are independent of each other, and hence r(', e")=0. In the case of the NAND gate and the NOR gate, delays of the edges e', e" corresponding to different types of MOS are also independent of each other.

Since only the edges corresponding to the interconnects in the same net and the edges within a single logic gate have a correlation in terms of variation in the delay, there exists no (directed) path that passes through the edges having a correlation in terms of the delay. Accordingly, the delays of all the edges on a single path are independent of each other.

Hereinafter, calculation of maximum delay distribution of a circuit of interest will be described using the delay distributions of the logic gate and interconnects and the correlation therebetween.

When stochastic variables x and y with a correlation coefficient $R[x, y]=\rho$ have normal distributions $N(\mu_1, \sigma_1^2)$ and $N(\mu_2, \rho_2^2)$, respectively, the mean Exp[t] and variance Var[t] of $t(=\max[x, y])$ are obtained by the following equations unless $\sigma_1^2 - \sigma_2^2 = \rho - 1 = 0$:

$$Exp[t] = \mu_1 \cdot \Phi(\beta) + \mu_2 \cdot \phi(-\beta) + \alpha \cdot \phi(-\beta) \quad (9)$$

$$Var[t] = (\mu_1^2 + \sigma_1^2) \cdot \Phi(\beta) + (\mu_2^2 + \sigma_2^2) \cdot \Phi(-\beta) + (\mu_1 + \mu_2) \cdot \alpha \cdot \phi(\beta) - Exp[t]^2 \quad (10)$$

where t is approximated to a normal distribution with two variables, and $$\alpha = \sqrt{\sigma_1^2 + \sigma_2^2 - 2\sigma_1\sigma_2\rho} \quad (11)$$

$$\beta = (\mu_1 - \mu_2)/\alpha \quad (12)$$

$$\varphi(x) = \frac{1}{\sqrt{2\pi}} \exp\left[-\frac{x^2}{2}\right] \quad (13)$$

$$\Phi(x) = \frac{1}{\sqrt{2\pi}} \int_{-\infty}^{x} \exp\left[-\frac{y^2}{2}\right] dy \quad (14)$$

(disclosed in C. E. Clark, "The greatest of a finite set of random variables" Operations Research, vol. 9, pp. 145–152, 1961).

Provided that correlation coefficients between z and x and between z and y are $R[x, z]=\rho_1$ and $R[y, z]=\rho_2$, respectively, a correlation coefficient $R[t, z]$ between t and a stochastic variable z with a normal distribution is given by the following equation using normal distributions of the three variables x, y, z:

$$R[t, z] = R[\max[x, y], z] = \frac{[\sigma_1 \cdot \rho_1 \cdot \Phi(\beta) + \sigma_2 \cdot \rho_2 \cdot \Phi(-\beta)]}{\sqrt{Var[t]}}. \quad (15)$$

When using the above equations, the following equations regarding probability are required. Provided that $f(x_1, x_2)$ is a probability density function of two variables $x_1$, $x_2$, the mean $Exp[x_1+x_2]$ and variance $Var[x_1+x_2]$ of $x_1+x_2$ are calculated by the following equations (16) and (17):

$$Exp[x_1 + x_2] = \int_{-\infty}^{\infty}\int_{-\infty}^{\infty} (x_1 + x_2) \cdot f(x_1, x_2) dx_1 dx_2 \quad (16)$$

$$= \int_{-\infty}^{\infty}\int_{-\infty}^{\infty} x_1 \cdot f(x_1, x_2) dx_1 dx_2 +$$

$$\int_{-\infty}^{\infty}\int_{-\infty}^{\infty} x_2 \cdot f(x_1 + x_2) dx_1 dx_2$$

$$= \int_{-\infty}^{\infty} x_1 \cdot f_{x_2}(x_1) dx_1 + \int_{-\infty}^{\infty} x_2 \cdot f_{x_1}(x_2) dx_2$$

$$= \mu_1 + \mu_2$$

$$Var[x_1 + x_2] = \int_{-\infty}^{\infty}\int_{-\infty}^{\infty} (x_1 + x_2 - \mu_1 - \mu_2)^2 \cdot f(x_1, x_2) dx_1 dx_2 \quad (17)$$

$$= \int_{-\infty}^{\infty}\int_{-\infty}^{\infty} \{(x_1 - \mu_1) + (x_2 - \mu_2)\}^2 \cdot f(x_1, x_2) dx_1 dx_2$$

$$= \int_{-\infty}^{\infty}\int_{-\infty}^{\infty} (x_1 - \mu_1)^2 \cdot f(x_1, x_2) dx_1 dx_2 +$$

$$\int_{-\infty}^{\infty}\int_{-\infty}^{\infty} (x_2 - \mu_2)^2 \cdot f(x_1 + x_2) dx_1 dx_2 +$$

$$\int_{-\infty}^{\infty}\int_{-\infty}^{\infty} 2(x_1 - \mu_1)(x_2 - \mu_2) \cdot f(x_1, x_2) dx_1 dx_2$$

$$= \sigma_1^2 + \sigma_2^2 + 2 \cdot Cov[x_1, x_2].$$

The mean $Exp[x_1+x_2]$ and variance $Var[x_1+x_2]$ of $x_1+x_2$ are thus given by the following equations (18) and (19):

$$Exp[x_1+x_2]=Exp[x_1]+Exp[x_2] \quad (18)$$

$$Var[x_1+x_2]=Var[x_1]+Var[x_2]+2Cov[x_1,x_2] \quad (19)$$

where $Cov[x_1, x_2]$ indicates covariance. Provided that $R[x_1, x_2]$ is a correlation coefficient, $Cov[x_1, x_2]$ is defined by the following equation (20):

$$Cov[x_1, x_2]=SQRT[Var[x_1]Var[x_2]]\cdot R[x_1,x_2] \quad (20).$$

Provided that $f(x_1, x_2, x_3)$ is a probability density function of the three variables $x_1$, $x_2$, $x_3$, covariance of $x_1+x_2$ and $x_3$, $Cov[x_1+x_2, x_3]$, can be calculated by the following equation (21):

$$Cov[x_1 + x_2, x_3] = \int_{-\infty}^{\infty}\int_{-\infty}^{\infty}\int_{-\infty}^{\infty} (x_1 + x_2 - \mu_1 - \mu_2)(x_3 - \mu_3) \cdot \quad (21)$$

$$f(x_1, x_2, x_3) dx_1 dx_2 dx_3$$

$$= \int_{-\infty}^{\infty}\int_{-\infty}^{\infty}\int_{-\infty}^{\infty} (x_1 - \mu_1)(x_3 - \mu_3) \cdot$$

$$f(x_1, x_2, x_3) dx_1 dx_2 dx_3 +$$

$$\int_{-\infty}^{\infty}\int_{-\infty}^{\infty}\int_{-\infty}^{\infty} (x_2 - \mu_2)(x_3 - \mu_3) \cdot$$

$$f(x_1, x_2, x_3) dx_1 dx_2 dx_3$$

$$= Cov[x_1, x_3] + Cov[x_2, x_3].$$

Thus, $\mathrm{Cov}[x_1+x_2, x_3]$ is given by the following equation (22):

$$Cov[x_1+x_2, x_3] = Cov[x_1, x_3] + Cov[x_2, x_3] \quad (22)$$

The given graph has a plurality of series edges. The procedure of replacing two series edges $e'=(u, v)$, $e''=(v, w)$ with a single edge $e^*=(u, v)$ will now be described using the above equations.

It is obvious from the way to produce the graph that the delays $t(e')$ and $t(e'')$ are independent of each other, and hence $t(e^*)=t(e')+t(e'')$. Therefore, the following equations (23) and (24) are satisfied:

$$\mu(e^*) = \mu(e') + \mu(e'') \quad (23)$$

$$\sigma^2(e^*) = \sigma^2(e') + \sigma^2(e'') \quad (24)$$

From the above equations (20) and (22), a correlation coefficient $\rho(e^*, e)$ between $t(e^*)$ and delay $t(e)$ of another edge e is given by the following equation (25):

$$\rho(e^*, e) = \{\sigma(e')\cdot\rho(e',e) + \sigma(e'',e)\}/\sqrt{\sigma^2(e') + \sigma^2(e'')} \quad (25)$$

This can be confirmed by the following equation (26):

$$\rho(e^*, e) = \frac{Cov[t(e^*), t(e)]}{\sigma(e^*)\cdot\sigma(e)} = \frac{Cov[t(e'), t(e)] + Cov[t(e''), t(e)]}{\sigma(e^*)\cdot\sigma(e)} \quad (26)$$

$$= \frac{\sigma(e')\cdot\sigma(e)\cdot\rho(e', e) + \sigma(e'')\cdot\sigma(e)\cdot\rho(e'', e)}{\sigma(e)\cdot\sqrt{\sigma^2(e') + \sigma^2(e'')}}$$

$$= \{\sigma(e')\cdot\rho(e', e) + \sigma(e'')\cdot\rho(e'', e)\}/\sqrt{\sigma^2(e') + \sigma^2(e'')}.$$

Such replacement of the series edges does not change independency of the delays of the edges on a path. In other words, if there is a path passing through both e and $e^*$, $\rho(e^*, e)=0$.

A probability density function $f(x_1, x_2, \ldots, x_n)$ of normal distribution with n variables is given by the following equation (27):

$$f(x_1, x_2, \ldots, x_n) = \frac{\sqrt{|\sigma^{ij}|}}{(\sqrt{2\pi})^n} \exp\left[-\frac{1}{2}(x-\mu)^T(\sigma^{ij})(x-\mu)\right] \quad (27)$$

where $(x-\mu)$ is a vector, $(x-\mu)^T$ is a transposed vector of $(x-\mu)$, and $(x-\mu)^T = (x_1-\mu_1, x_2-\mu_2, \ldots, x_n-\mu_n)$. $\sigma_{ij}$ is a symmetric matrix given by the following equation (28), and $\sigma$ $$\sigma^{ij} = (\sigma_{ij})^{-1}: \quad (28)$$

$$\sigma_{ij} = \begin{pmatrix} \sigma_1^2 & \sigma_1\sigma_2\rho_{12} & \cdots & \sigma_1\sigma_n\rho_{1n} \\ \sigma_1\sigma_2\rho_{12} & \sigma_2^2 & \cdots & \sigma_2\sigma_n\rho_{2n} \\ \vdots & \vdots & \ddots & \vdots \\ \sigma_1\sigma_n\rho_{1n} & \sigma_2\sigma_n\rho_{2n} & \cdots & \sigma_n^2 \end{pmatrix}.$$

$|\sigma_{ij}|$ is a determinant of $\sigma_{ij}$. $\mu, \sigma^2$ and $\sigma$ corresponds to the mean, variance and correlation coefficient.

A probability density function $f(x_1, x_2)$ of normal distribution with two variables having a correlation coefficient $\rho$ is given by the following equation (29):

$$f(x_1, x_2) = \quad (29)$$

$$\frac{1}{2\pi\sigma_1\sigma_2\sqrt{1-\rho^2}}\exp\left[-\frac{1}{2(1-\rho^2)}\left\{\left(\frac{x_1-\mu_1}{\sigma_1}\right)^2 - 2\rho\left(\frac{x_1-\mu_1}{\sigma_1}\right)\left(\frac{x_2-\mu_2}{\sigma_2}\right) + \left(\frac{x_2-\mu_2}{\sigma_2}\right)^2\right\}\right].$$

For $\rho=1$, the two variables $x_1, x_2$ have the following relation:

$$\frac{x_1-\mu_1}{\sigma_1} = \frac{x_2-\mu_2}{\sigma_2}. \quad (30)$$

Provided that $f(x_1, x_2, \ldots, x_n)$ is a probability density function with n variables, the probability $\mathrm{Pro}[\max[x_1, x_2, \ldots, x_n]. D]$ that all variables are not greater than D is given by the following equation (31):

$$Pro[\max[x_1, x_2, \ldots, x_n] \leq D] = \quad (31)$$

$$\int_{-\infty}^{D}\int_{-\infty}^{D}\cdots\int_{-\infty}^{D}f(x_1, x_2, \ldots, x_n)dx_1 dx_2 \ldots dx_n.$$

Such a value D that the probability $\mathrm{Pro}[\max[x_1, x_2, \ldots, x_n]. D]$ is equal to or less than a specified value Y is obtained by solving the following integral equation (32):

$$Y = \int_{-\infty}^{D}\int_{-\infty}^{D}\cdots\int_{-\infty}^{D}f(x_1, x_2, \ldots, x_n)dx_1 dx_2 \ldots dx_n. \quad (32)$$

Calculation of Delay Distribution

Hereinafter, a method for calculating delay distribution of an integrated circuit using the above relations will be described.

More specifically, distribution of the maximum delay $d(v)$ to a vertex v of a sink set $T (v \in T)$ (i.e., mean $\mathrm{Exp}[d(v)]$ and variance $\mathrm{Var}[d(v)]$), and correlation coefficient $R[d(v), d(w)]$ between the delays to vertices v, w of the sink set T (V, w $\in$ T) are obtained. Once these values are obtained, the probability that the critical path delay $\max[d(v|v \in T]$ is equal to or less than D is obtained from the above equation (31), assuming that every $d(v)$ has a normal distribution with $|T|$ variables. The distribution thereof can be obtained by differentiating the equation (31) by D as given by the following equation (33):

$$g(D) = \frac{d\left[\int_{-\infty}^{D}\int_{-\infty}^{D}\cdots\int_{-\infty}^{D}f(x_1, x_2, \ldots, x_n)dx_1 dx_2 \ldots dx_n\right]}{dD}. \quad (33)$$

These values can be calculated numerically. However, such numerical calculation takes a very long time. In contrast, approximating the above equation (33) by normal distribution enables high-speed calculation of the distribution by repeatedly conducting the following procedure (the above equations (9) to (15)).

In the following description, $d(v)$ denotes the maximum delay to each vertex v (the longest path length from a source u (u $\in$ S) to v), and $m(v)$ ($=\mathrm{Exp}[d(v)]$) and $s(v)$ ($=\mathrm{Var}[d(v)]$) denote the mean and variance of $d(v)$, respectively. Moreover, $r(v, w)$ ($=R[d(v), d(w)]$) denotes the correlation coefficient between the maximum delays $d(v)$ and $d(w)$ to two vertices v and w, and $c(v, e)$ ($=R[d(v), t(e)]$) denotes the correlation coefficient between the maximum delay d(v) to a vertex v and the delay t(e) of an edge e.

Figure 1:
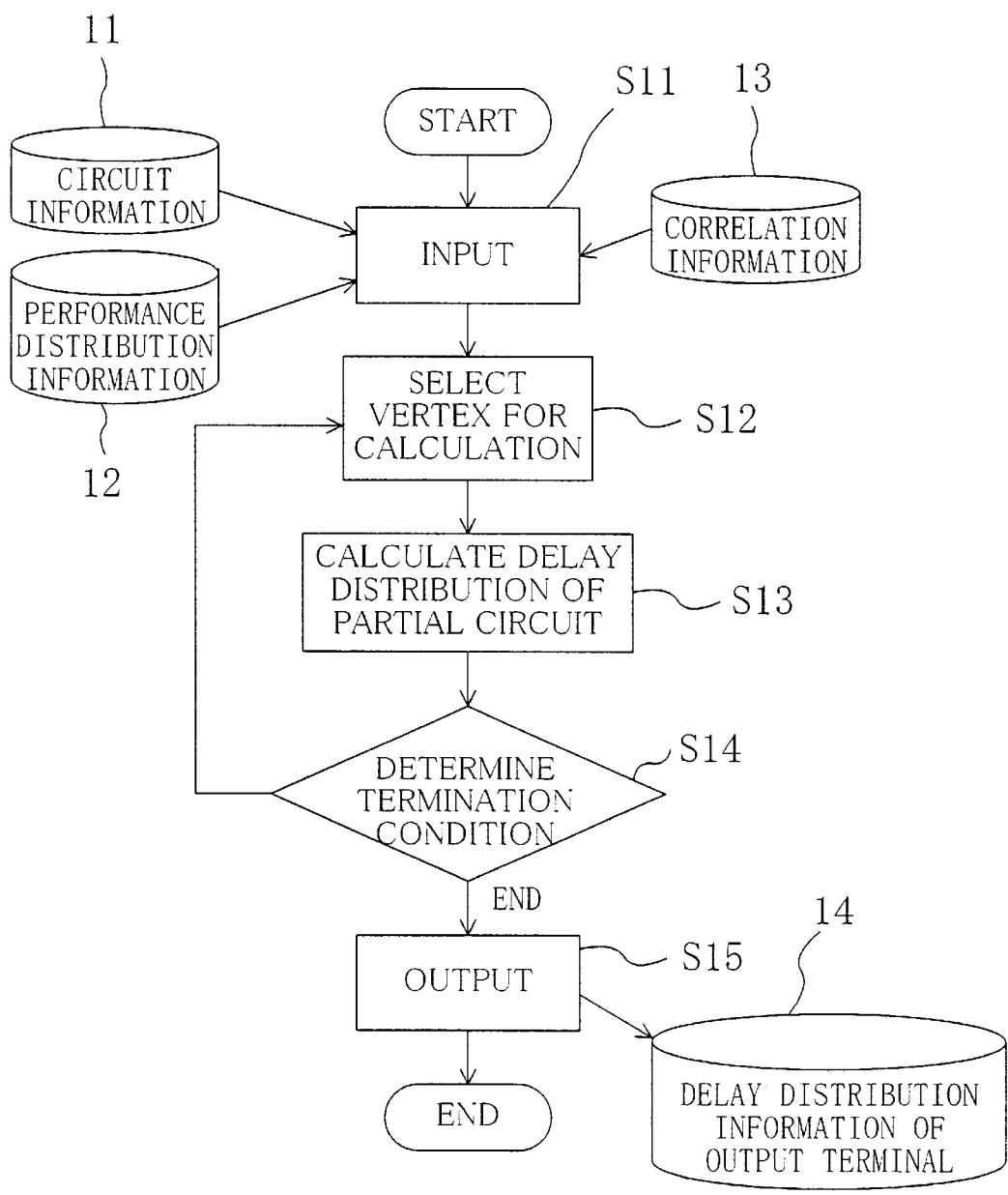
FIG. 1 is a flowchart illustrating a delay distribution calculation method according to a first embodiment of the present invention.

FIG. 1 is a flowchart illustrating a delay distribution calculation method according to the first embodiment of the present invention. In the present embodiment, distribution of the maximum delay d(v) from a source to each vertex v (v∈v) is calculated on the topological order in the acyclic graph G. Therefore, a vertex set Front that always satisfies the following conditions (A), (B) and (C) is considered:

(A) For each vertex v (v∈Front), the mean m(v) and variance s(v) of the maximum delay d(v) are known;

(B) For any two vertices v, u (v, u∈Front), the correlation coefficient r(v, u) between the maximum delays d(v) and d(u) is known; and (C) For each vertex v (v∈Front), the correlation coefficient c(v, e) between the maximum delay d(v) and the delay t(e) of an arbitrary edge e (e∈E) is known.

Note that it is herein assumed that the series edges have been replaced with a single edge by the method described above.

First, in step S11, the following information is input: circuit information 11 indicating connection between elements in an integrated circuit; performance distribution information 12 indicating performance distribution of interconnects and elements such as logic gates which are included in the integrated circuit; and correlation information 13 indicating correlation between delay distributions of the interconnects and the elements. An acyclic graph representing the integrated circuit is generated based on the circuit information 11.

Then, in step S12, a vertex for delay distribution calculation is selected. Initially, Front=S (source set), and for each vertex u (u∈S), m(u)=s(u)=0. Since all the correlation coefficients between distinct vertices in the set Front can be set to zero, the above conditions are satisfied. Note that, if the arrival times of primary inputs vary and have differences, they can be considered in this step. In the subsequent repetition, a single vertex is sequentially selected from the acyclic graph on the topological order.

Thereafter, in step S13, correlation between the delay distribution of the vertex selected in step S12 and the vertex that has already been selected is calculated. A new vertex w is then added to the set Front while satisfying the above conditions (A), (B) and (C).

Assuming that a vertex in the set Front is $v_i$ (i=1, 2, . . . , k, . . . , h), such a vertex w that every incoming edge comes from the set Front is considered. For simplification, the incoming edges to the vertex w are denoted by $e_i=(v_i, w)$ (i=1, 2, . . . , k). Such a set of vertices $v_i (v_i \in$ Front) that all the terminal vertices u of the outgoing edges ($v_i$, u) are included in Front∪[w] is denoted by Eliminate.

Provided that $d'_i(w)$ is the maximum delay of paths from a source to the vertex w through an edge $e_i=(v_i, w)$, $$d'_i(w)=d(v_i)+t(e_i) \quad (34)$$

Therefore, based on the above equations (18) to (20), the mean m'i(w) and variance s'i(w) of $d'_i(w)$ can be obtained by the following equation (35):

$$m'_i(w)=Exp[d'_i(w)]=m(v_i)=m(v)+\mu(e_i)$$
$$s'_i(w)=Var[d'_i(w)]=s(v_i)+\sigma^2(e_i)+2\sqrt{s(v_i)}\cdot\sigma(e_i)\cdot c(v_i, e_i) \quad (35)$$

Since the delays of the edges $e_i$ are independent of the delays of the edges on any path leading to $v_i$, $d(v_i)$ and $t(e_i)$ are independent of each other, and $c(v_i, e_i)=0$. Therefore, the following relation is obtained:

$$s'_i(w) = Var[d_i(w)] \quad (36)$$
$$= s(v_i) + \sigma^2(e_i).$$

From the above equations (20) and (22), for any vertex u (u∈Front) satisfying s(u)≠0 and any edge e (e∈E), $$\sqrt{s'_{i(w)s(u)}}\cdot r'_i(w,u)=\sqrt{s(v_{i)s(u)}}\cdot r(v_i,u)+\sqrt{s(u)}\cdot\sigma(e_i)\cdot c(u,e_i) \quad (37)$$

$$\sqrt{s'_{i(w)}}\cdot\sigma(e)\cdot c'_i(w,e)=\sqrt{s(v_i)}\cdot\sigma(e)\cdot c(v_i,e)\cdot\sigma(e_i)\cdot(e)\cdot\rho(e_i,e) \quad (38)$$

Therefore, the following relations is obtained:

$$r'_i(w,u)=\{\sqrt{s(v_i)}\cdot r(v_i,u)+\sigma(e_i)\cdot c(u,e_i)\}/\sqrt{s'_{i(w)}} \quad (39)$$

$$c'_i(w,e)=\{\sqrt{s(v_i)}\cdot c(v_i,e)+\sigma(e_i)\cdot\rho(e_i, e)\}/\sqrt{s'_{i(w)}} \quad (40)$$

For s(u)=0, r'$_i$(w,u)=0.

The maximum delay of paths from a source v0 to a vertex w through any of the edges $e_j=(v_j, w)$ (j=1, 2, . . . , i) is denoted by $d_i(w)$, that is, $$d_i(w)=\max[d'_j(w)|1 \leq j \leq i] \quad (41)$$

It is obvious that $d_1(w)=d'_1(w)$. Therefore, if the distribution for $d_{i-1}(w)$ has been obtained, that is, if the following values are known, $$m_{i-1}(w)=Exp[d_{i-1}(w)] \quad (42)$$

$$s_{i-1}(w)=Var[d_{i-1}(w)] \quad (43)$$

$$r_{i-1}(w,u)=R[d_{i-1}(w), d(u)] \quad (44)$$

$$c_{i-1}(w,e)=R[d_{i-1}(w), t(e)] \quad (45)$$

then the following equations (46) to (49) below will be obtained:

$$m_i(w)=Exp[d_i(w)] \quad (46)$$

$$s_i(w)=Var[d_i(w)] \quad (47)$$

$$r_i(w,u)=R[d_i(w), d(u)] \quad (48)$$

$$c_i(w,e)=R[d_i(w), t(e)] \quad (49)$$

Therefore, the following equation (50) is used:

$$d_i(w)=\max[d_{i-1}(w),d'_i(w)] \quad (50)$$

Once the distribution of d(w) is obtained from i=2 to i=k, the vertex w can be added to the set Front. It can be seen that when the vertex w is added to the set Front, the new set Front=(Front−Eliminate)∪[w] satisfies the above conditions (A), (B) and (C).

The distribution of $d_i(w)$ is calculated using the above equations (9) to (15), that is, the following equation (51):

$$\alpha=SQRT[s_{i-1}(w)+s'_i(w)-2SQRT[s_{i-1}(w)s'_i(w)]\cdot r'(w,w)] \quad (51)$$

$r'_i(w, w)=R[d_{i-1}(w), d'_i(w)]$ can be calculated by the following equation (52):

$$r'_i(w, w) = R[d_{i-1}(w), d'_i(w)] = \frac{Cov[d_{i-1}(w), d(v_i) + t(e_i)]}{\sqrt{s_{i-1}(w)} \sqrt{s'_i(w)}} \quad (52)$$

$$= \frac{Cov[d_{i-1}(w), d(v_i)] + Cov[d_{i-1}(w), t(e_i)]}{\sqrt{s_{i-1}(w)} \sqrt{s'_i(w)}}$$

$$= \frac{\sqrt{s_{i-1}(w)s(v_i)} \cdot r_{i-1}(w, v_i) + \sqrt{s_{i-1}(w)} \cdot \sigma(e_i) \cdot c_{i-1}(w, e_i)}{\sqrt{s_{i-1}(w)} \sqrt{s'_i(w)}}$$

$$= \frac{\sqrt{s(v_i)} \cdot r_{i-1}(w, v_i) + \sigma(e_i) \cdot c_{i-1}(w, e_i)}{\sqrt{s'_i(w)}}.$$

Accordingly, provided that $$\alpha = \quad (53)$$

$$\sqrt{s_{i-1}(w) + s'_i(w) - 2\sqrt{s_{i-1}(w)} \left\{ \sqrt{s(v_i)} \cdot r_{i-1}(w, v_i) + \sigma(e) \cdot c_{i-1}(w, e) \right\}}$$

$$\beta = (m_{i-1}(w) - m'_i(w))/\alpha, \quad (54)$$

the distribution of $d_i(w)$ can be calculated from the following equations (55) to (58):

$$m_i(w) = \text{Exp}[\max[d_{i-1}(w), d'_i(w)]] \quad (55)$$
$$= m_{i-1}(w) \cdot \Phi(\beta) + m'_i(w) \cdot \Phi(-\beta) + \alpha \cdot \varphi(\beta)$$

$$s_i(w) = Var[\max[d_{i-1}(w), d'_i(w)]] \quad (56)$$
$$= \{(m_{i-1}(w))^2 + s_{i-1}(w)\}\Phi(\beta) + \{(m'_i(w))^2 + s'_i(w)\}\Phi(-\beta) +$$
$$\{m_{i-1}(w) + m'_i(w)\} \cdot \alpha \cdot \varphi(\beta) - \{m_i(w)\}^2$$

$$r_i(w, u) = R[\max[d_{i-1}(w), d'_i(w)], d(u)] \quad (57)$$
$$= \frac{\left\lfloor \sqrt{s_{i-1}(w)} \cdot r_{i-1}(w, u) \cdot \Phi(\beta) + \sqrt{s'_i(w)} \cdot r'_i(w, u) \cdot \Phi(-\beta) \right\rfloor}{\sqrt{s_i(w)}}$$

$$c_i(w, e) = R[\max[d_{i-1}(w), d'_i(w)], t(e)] \quad (58)$$
$$= \frac{\left\lfloor \sqrt{s_{i-1}(w)} \cdot c_{i-1}(w, e) \cdot \Phi(\beta) + \sqrt{s'_i(w)} \cdot c'_i(w, e) \cdot \Phi(-\beta) \right\rfloor}{\sqrt{s_i(w)}}.$$

Accordingly, by repeating the process of adding a vertex w within the circuit to the set Front, all the vertices in the circuit can be added to the set Front, enabling delay distribution of the circuit to be calculated while taking a correlation into account.

By thus repeating the process of removing the set Eliminate from the set Front and adding a vertex w to the set Front so that Front=T, the processing is terminated. Whether the condition for terminating the processing (that is, Front=T) is satisfied or not is determined in step S14.

When delay distribution calculation of all the vertices is completed, delay distribution information 14 of the output terminal, that is, the mean and variance of the delay to each vertex in the sink T, is output in step S15, and the processing is then terminated. Otherwise, the flow returns to step S12 so that the processing is continued.

Note that, in the present embodiment, the correlation information is represented by the correlation coefficient in the delay distribution. However, the correlation information may alternatively be represented by the correlation degree of a delay value itself. The delay distribution may be calculated using the correlation regarding performance other than the delay.

Figure 12:
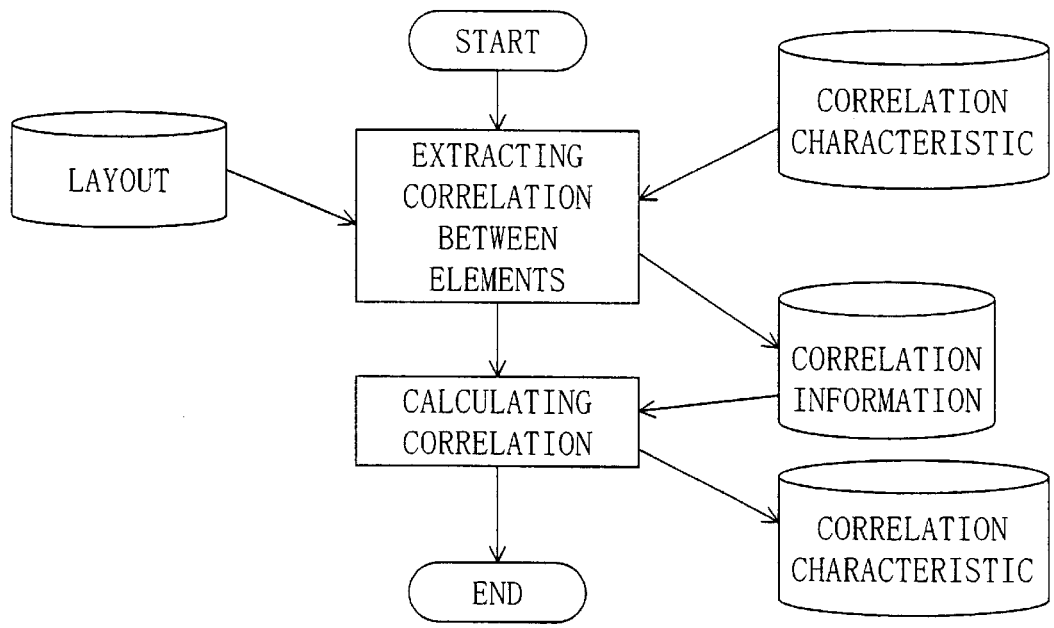
FIG. 12 is a flowchart illustrating the process of producing correlation information.

For example, the correlation information may be produced by referring to the layout of an integrated circuit to be designed by using correlation characteristic information. The term "correlation characteristics information" herein indicates the relation between correlation of performance between interconnects or elements and characteristics in terms of the layout. FIG. 12 shows the process of producing correlation information.

Characteristics information of the elements include delay, gate width, gate length, oxide film thickness, ion implantation concentration, source-drain saturation current and threshold voltage of a transistor, and the like. The process variation of these values results from completely random factors, and factors that vary depending on the layout information such as shape, location and orientation. For example, the ion implantation concentration of the transistor diffusion layer depends on the orientation of an implantation apparatus in the manufacturing process. Therefore, the same characteristics are more likely to be obtained when the implantation apparatus has the same orientation. Moreover, the values such as ion implantation concentration and oxide film thickness are likely to vary continuously depending on the location of the elements. For example, two elements are more likely to exhibit similar characteristics when they are located closer. Furthermore, the gate width and the gate length are likely to vary depending on the surrounding layout pattern such as the distance to another gate. Moreover, there is a strong correlation of variation between the delays of distinct paths to the same logic gate and between the interconnect delays in the case where a common interconnect branches out.

Examples of the correlation characteristics information are as follows:

(1) the distance D between two elements and the correlation coefficient R between delay distributions of the two elements have the relation: R=a·exp(−D/b) (where a, b are a constant);

(2) the correlation coefficient is c when two elements are arranged with the same orientation, but is e when they are arranged with different orientations (where c, e are a constant);

(3) when an interconnect branches out, and the rate of a common part to the entire interconnect length is w, the correlation between the respective interconnect delays is R=f·w (where f is a constant); and (4) the correlation coefficient between element delays is g when the element delays result from the same element, but is h when they result from distinct elements (where g, h are a constant).

Either at least one of the above relations or a combination thereof may be used.

Figure 13:
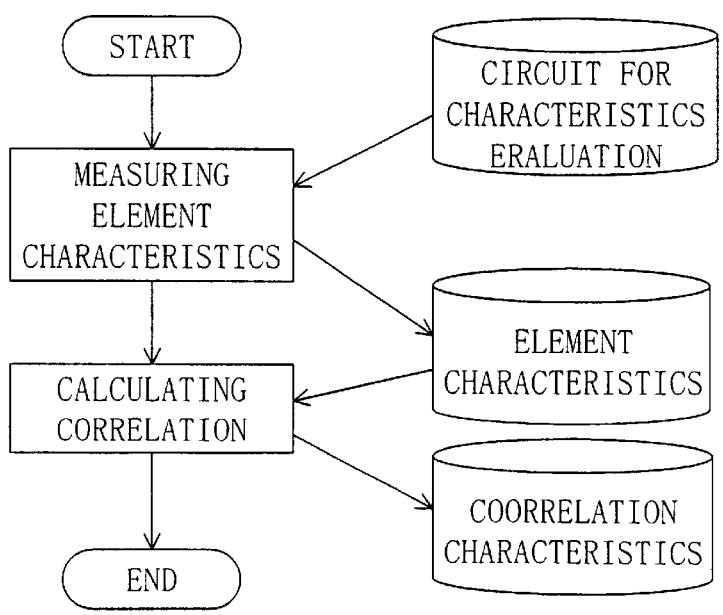
FIG. 13 is a flowchart illustrating the process of obtaining correlation characteristics information.

The correlation characteristics information may be obtained by measurement. For example, an integrated circuit including a multiplicity of sample elements having different orientations, different surrounding layout patterns, different distances to another element is manufactured for characteristics evaluation, and characteristics of each element are measured in order to calculate the mean and variance of the element characteristics. FIG. 13 shows the process of obtaining correlation characteristics information. Even if the correlation between delay distributions cannot be obtained directly, it is known that a saturation current of a transistor is approximately proportional to the delay, and that the gate length is inversely proportional to the saturation current and the gate width is proportional to the saturation current. Therefore, if the correlation between the layout conditions and the values such as gate length, gate width and saturation current can be obtained, it can be used as correlation between the delays.

The correlation characteristics information can thus be obtained prior to the integrated circuit design, according to the process. In the actual integrated circuit design, correlation information between elements can be obtained from the correlation characteristics information, based on the information such as actual layout.

For example, correlation coefficient R between delay distributions of two elements arranged with the same orientation and at a distance D is obtained by R=f(D, c, h). Herein, f(x, y, z) is an arbitrary function, for example, f(x, y, z)=Kyz/x (K is a constant).

SECOND EMBODIMENT

The second embodiment of the present invention relates to a method for evaluating a given circuit by removing false paths.

A "logical false path" can be characterized by using information on the connection structure of a circuit. In other words, a logical false path can be defined as a path passing through both two vertices x and y in an acyclic graph G=(V, E). A "functional false path" can be specified as a path including a causative path, and a causative path can be defined as a path from a vertex x of X to a vertex y of Y by using a pair of vertex sets (X, Y) (disclosed in H. C. Chen and D. H. Du, "Path sensitization in critical path problem," IEEE Trans. Computer-Aided Design of ICs and Systems, vol. 12, no. 2, pp. 196–207, 1993).

Figure 2:
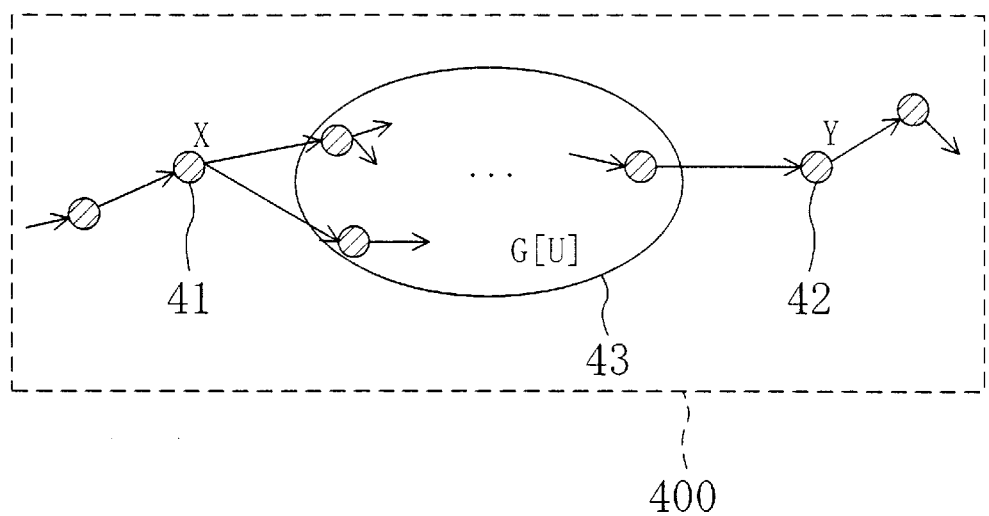
FIG. 2 shows representation specifying false paths.

More specifically, in FIG. 2, false paths can be designed as paths passing through both a vertex 41 of X and a vertex 42 of Y in a specified pair of vertex sets (X, Y). Therefore, removing these paths from the graph G 400 would enable improved accuracy of the critical path delay.

A method for removing the false paths that can be specified by a pair of vertex sets (X, Y) will now be described. It is herein assumed that there exists no directed path between distinct two vertices x' and x" included in X, and no directed path between distinct two vertices included in Y. In a logic circuit, $x \in X$ and $y \in Y$ correspond to an input and an output of a gate, respectively. Therefore, the above assumption is not a contrived assumption. A set U' indicates a set of vertices having both a directed path from a vertex x of X and a directed path to a vertex y of Y, and a set U indicates the set U' having X and Y removed therefrom (U=U'-X-Y). G[U] =(U, E[U]) indicates a vertex section graph 43 of the graph G induced by the set U, where $E[U]=[(v, w) \in E | v \in U, w \in U]$.

Figure 3:
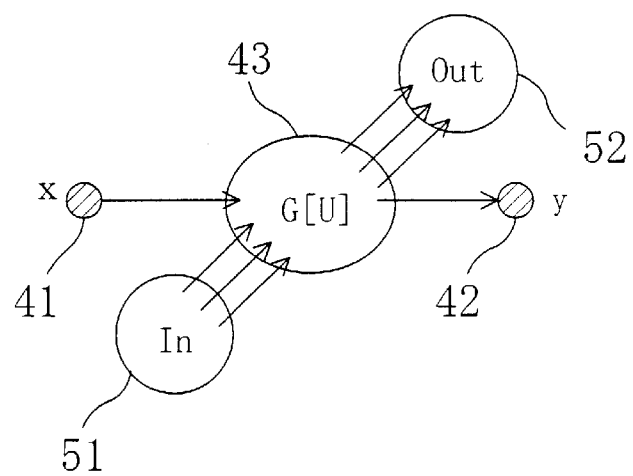
FIG. 3 shows an unmodified graph.

In FIG. 3, Out is a set 52 of terminal vertices of the edges going out from the set G[U] other than the vertex 42 of Y, and In is a set 51 of initial vertices of the edges coming into the set G[U] other than the vertex 41 of X. In other words, Out and In are defined as follows:

$$Out=\{v \in V | (u,v) \in E, u \in U, v \notin U, v \in Y\}$$

$$In=\{v \in V | (v,u) \in E, u \in U, v \notin X\}.$$

It is obvious that out and In satisfy the following conditions:

i. Out and In have no common vertex, and there exists no path from a vertex v of Out to a vertex w of In. The reason for this is as follows: assuming that there is a directed path from a vertex v to a vertex w, both a directed path from a vertex of X and a directed path to a vertex of Y exist for such a vertex v or w, which is inconsistent with the assumption of the set U;

ii. there exists no path from a vertex v of Out to a vertex y of Y; and iii. there exists no path from a vertex x of X to a vertex v of In. Assuming that there exists such a path, the vertex v must be included in U, which is inconsistent with the assumption of the set U.

Figure 4:
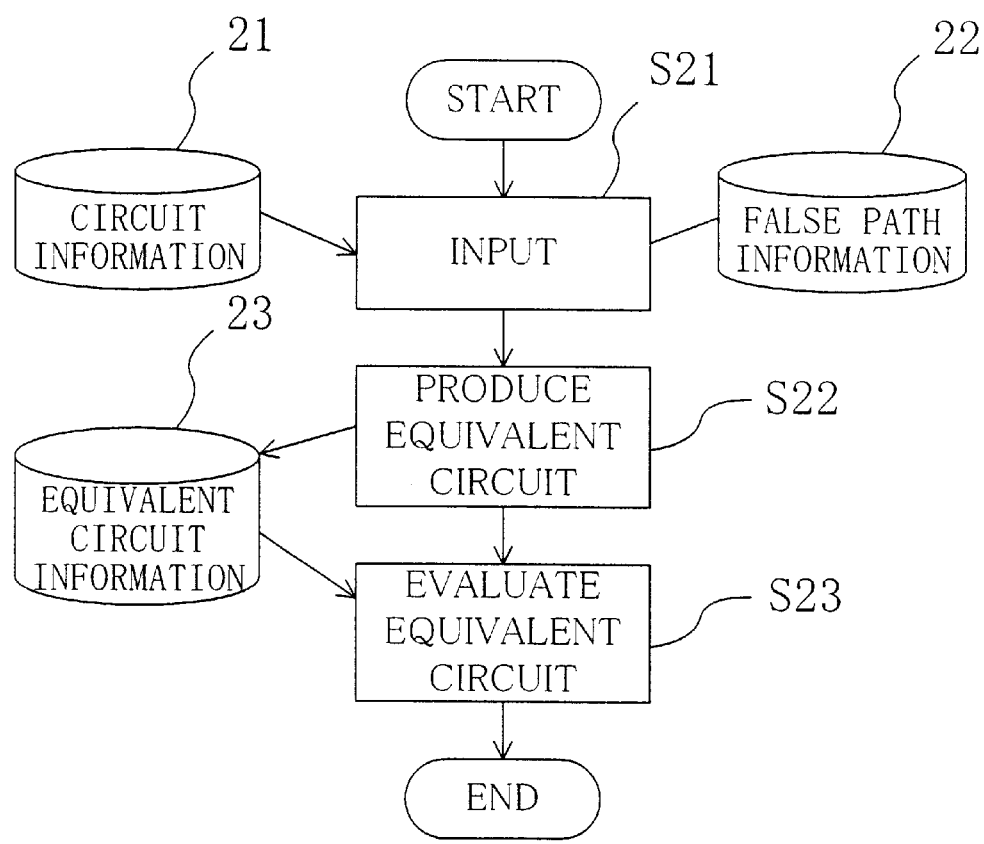
FIG. 4 is a flowchart illustrating a circuit evaluation method according to a second embodiment of the present invention.

FIG. 4 is a flowchart illustrating a circuit evaluation method of the present invention. In FIG. 4, circuit information 21 and false path information 22 are first input in step S21. The circuit information 21 indicates the connection, performance and the like of a circuit to be evaluated. The false path information 22 represents each false path by a set of two vertices on the graph representing the integrated circuit.

In step S22, an equivalent circuit including no false path is then produced from the circuit information 21. If there are a plurality of false paths, step S22 is conducted repeatedly. In step S33, the circuit is evaluated in terms of the delay, power consumption and the like by using information 23 on the equivalent circuit including no false path.

Figure 5:
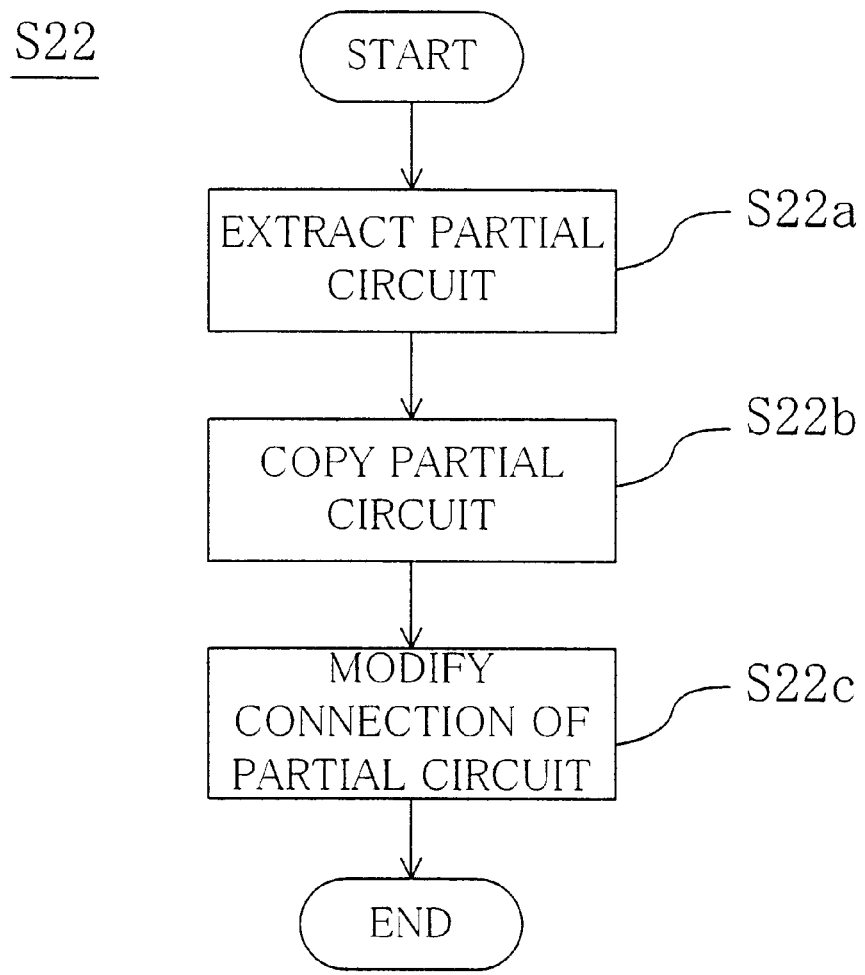
FIG. 5 is a flowchart illustrating the process of producing an equivalent circuit in the circuit evaluation method of FIG. 4.

FIG. 5 is a flowchart illustrating the process in step S22. An equivalent circuit is produced by modifying the acyclic graph G=(V, E) for the pair of vertex sets (X, Y).

Figure 6:
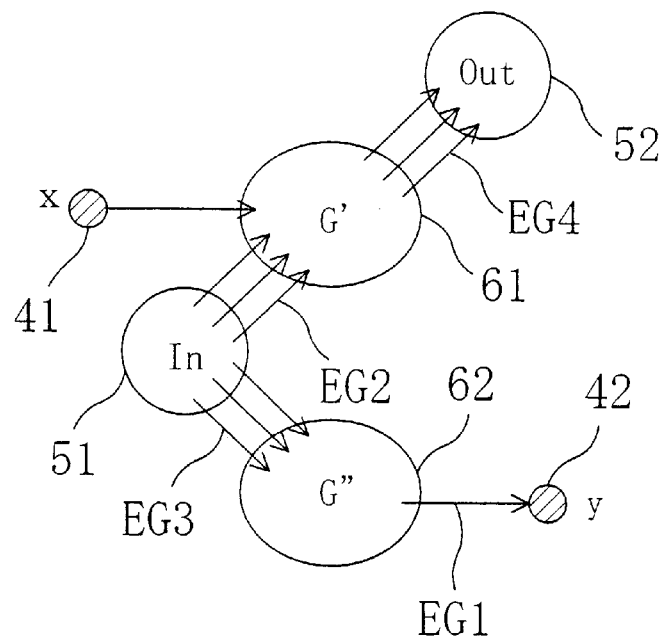
FIG. 6 shows a modified graph.

First, as shown in FIG. 3, a partial circuit G[U] 43 is extracted in step S22a. As shown in FIG. 6, in step-S22b, a copy of the partial circuit G[U] 43 is made, and a graph G" 62 corresponding to a second partial circuit is generated. The original partial circuit G[U] 43 is represented by a graph G' 61 corresponding to a first partial circuit. Then, in step S22c, all the edges from a vertex in the graph G' 61 to y 42 are removed, and edges EG1 from a corresponding vertex in the graph GΔ 62 to y 42 are generated instead. A copy EG3 of each edge EG2 going out from a vertex of In 51 into a vertex in the graph G' 61 is generated between the vertex of In 51 and a corresponding vertex in the graph G" 62. Note that each edge EG4 going out from a vertex in the graph G'61 into a vertex of Out 52 is left intact.

If a new sink is created in the graph G' 61 or a new source is created in the graph g" 62, the process of removing such vertices and edges connecting thereto is repeated until no sink or source exists in the graphs G' 61 and G" 62. The acyclic graph thus generated is denoted by G<(X, Y)>.

This graph <(X, Y)>satisfies the following conditions:

(i) There exists no path in G<(X, Y)>that passes through both a vertex x of X and a vertex y of Y;

(ii) For each path in the original graph G that does not pass through both a vertex of X and a vertex of Y, there exists a corresponding path in G<(X, Y)>; and (iii) For each path in G<(X, Y)>, there exists a corresponding path (that passes through the same vertex and edge) in the original graph G.

Accordingly, obtaining variation in the critical path delay in G<(X, Y)>corresponds to obtaining variation in the maximum delay in a path that does not pass through both a vertex of X and a vertex of Y in the original graph G.

Figure 7:
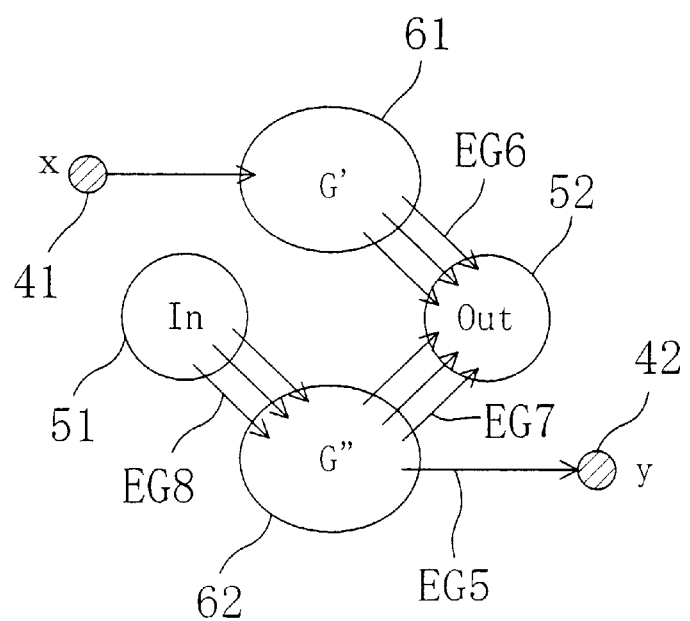
FIG. 7 shows another example of the modified graph.

FIG. 7 shows another example of the graph modifying process for producing an equivalent circuit satisfying the above conditions. In step S22c, all the edges from a vertex in the graph G' 61 corresponding to a first partial circuit to a vertex 42 of Y are removed, and edges EG5 from a corresponding vertex in the graph G" 62 corresponding to a second partial circuit to a vertex 42 of Y are generated instead. After adding G" 62 to G' 61, a copy EG7 of each edge EG6 going out from a vertex in G' 61 into a vertex of Out 52 is generated between a corresponding vertex in G" 62 to the vertex in Out 52. Moreover, all the edges going out from a vertex of In 51 into a vertex in G' 61 are removed, and edges EG8 from the respective vertex of In 51 to a corresponding vertex of G" 62 are generated instead.

In the example of FIG. 6, the graph G' 61 corresponding to a first partial circuit is connected to a first vertex 41, In 51 and Out 52, but is not connected to a second vertex 42. On the other hand, the graph G" 62 corresponding to a second partial circuit is connected to the second vertex 42 and In 51, but is not connected to the first vertex 41 and Out 52. As a result, there exists no path from the first vertex 41 toward the second vertex 42.

In the example of FIG. 7, the graph G" 61 corresponding to a first partial circuit is connected to the first vertex 41 and Out 52, but is not connected to the second vertex 42 and In 51. On the other hand, the graph GI" 62 corresponding to a second partial circuit is connected to the second vertex 42, In 51 and Out 52, but is not connected to the first vertex 41. As a result, there exists no path from the first vertex 41 toward the second vertex 42.

Hereinafter, a method for producing an equivalent circuit according to the present embodiment will now be described generally.

A set of all the false paths to be removed is represented by a set of pairs of vertex sets, $F=[(X_i, Y_i)|i=1, 2, \ldots, f]$. In order to remove all the false paths from G, the above modifying process is repeated for each pair (X, Y) ($\in F$). When creating G<X, Y> by modifying G, the vertices of U are copied. Therefore, each pair (X', Y') other than (X, Y) ((X', Y')$\in$F−[(X, Y)]) is corrected as follows by using U:

I. For X'$\cap$U$\neq$f:

When a copy of a vertex of x'$\cap$U remains in G<X, Y> without creating a new sink or source, the copied vertex is added to X'; and II. For Y'$\cap$U$\neq$f:

When a copy of a vertex of Y'$\neq$U remains in G<X, Y>without creating a new sink or source, the copied vertex is added to Y'.

A non-updated pair is denoted by (X', Y') and an updated pair is denoted by (X", Y"). It is obvious that there exists no directed path connecting vertices of X" and no directed path connecting vertices of Y" in G<X, Y>. In G, a set of paths passing through both a vertex of X and a vertex of Y is denoted by P(X, Y), and a set of paths passing through both a vertex of X' and a vertex of Y' is denoted by P(X', Y'). In G<X, Y>, a set of paths passing through both a vertex of X" and a vertex of Y" is denoted by P'(X", Y"). Every path included in P'(X", Y") corresponds to a path in P(X', Y'). In other words, every path corresponding to a path in P(X', Y') and existing in G<X, Y> is included in P'(X", Y"). Therefore, no path in G other than those in P(X', Y') is included in P'(X", Y").

Accordingly, provided that the graph obtained by modifying G<(X, Y)> for (X', Y') is G", all the paths in P'(X", Y") have been removed from G". This means that all the paths in P(X', Y') are removed from G. In other words, the following conditions are satisfied:

(i) There exists no path corresponding to P(X, Y) and no path corresponding to P(X', Y') in G;

(ii) All the paths included in G<X, Y> other than P'(X", Y") exist in G". Accordingly, all the paths in G other than in P(X, Y) and P(X', Y') exist in G"; and (iii) Every path in G" has a corresponding path in G<X, Y>, and hence in G.

From the above, provided that the graph from which all the false paths specified by F have been removed by repeating the modification process of the graph and the update process of the pairs of vertex sets described above is $G^*=(V^*, E^*)$, respective paths on $G^*=(V^*, E^*)$ and the original graph G=(V, E) have the following relations:

(i) For each pair (X, Y) $\in$ F, there exists no path in G* that passes through both a vertex x of X and a vertex y of Y;

(ii) All the paths in G other than the false paths specified by F exist in G*; and (iii) Every path in G* has a corresponding path in G.

This process can be represented as follows:

For $F=[(X_i, Y_i)|i=1, 2, \ldots, f]$, $G\_(1)=G<X\_(1), Y\_(1)>$, $G_i=G_{i-1}<X_i^{i-1}, Y_i^{i-1}>$ (i=2, ..., f), where $G_{i-1}<X_i^{i-1}, Y_i^{i-1}>$ (i=2, ..., f) is a graph resulting from modifying the graph $G_{i-1}$ for $(X_i^{i-1}, Y_i^{i-1})$, and $(X_i^{i-1}, Y_i^{i-1})$ (i=2, ..., f) is a pair resulting from updating $(X_{i-1}^{i-2}, Y_{i-1}^{i-2})$ by using $U_{i-1}$ defined by $(X_{i-1}^{i-2}, Y_{i-1}^{i-2})$.

$U_{i-1}$ is obtained by removing a vertex of $X_{i-1}^{i-2}$ and a vertex of $Y_{i-1}^{i-2}$ from a set of vertices on $G_{i-1}=G\_(i-2)<X_{i-1}^{i-2}, Y_{i-1}^{i-2}>$ that have both a directed path from a vertex of $X_{i-1}^{i-2}$ and a directed path to a vertex of $Y_{i-1}^{i-2}$.

Starting with $G\_(0)=G$, $X\_(1)\cdot(0)=X\_(1)$, $Y\_(1)\cdot(0)=Y\_(1)$, the process of producing $G_i=G_{i-2}<X_i^{i-1}, Y_i^{i-1}>$is repeated for each $(X_i, Y_i)$ (i=1, 2, ..., f), whereby $G_f$ is obtained. Provided that a set of all the paths on G specified by F is $P(F)=UiP(X_{ii}, _{Yi})$, there exists no path on $G_f$ that corresponds to P(F), and each path on G other than P(F) has a corresponding path on $G_f$.

THIRD EMBODIMENT

The third embodiment of the present invention relates to a method for extracting false paths from a circuit to be designed. The extracted false paths can be removed by using the method of the second embodiment.

As described above in the second embodiment, a "logical false path" can be characterized by using information on the connection structure of a circuit. In other words, a logical false path can be defined as a path passing through both of two vertices x, y in an acyclic graph G=(V, E).

Like a signal value "0" in the AND gate, a signal value that determines the output of a logic gate when applied to one input thereof is called a "control signal". Like a signal value "1'" in the AND gate, a signal value that does not determine the output of a logic gate even when applied to one input thereof is called a "non-control signal". There are a control signal and a non-control signal for the AND, OR, NAND and NOR gates, and these signals have a negative relation. In contrast, in an inverter, both "0" and "1" are control signals, and in the XOR gate, both "0" and "1" are non-control signals. In other words, in the AND, OR, NAND and NOR gates and the inverter, the output is determined when a control signal applied to one input thereof.

Figure 11:
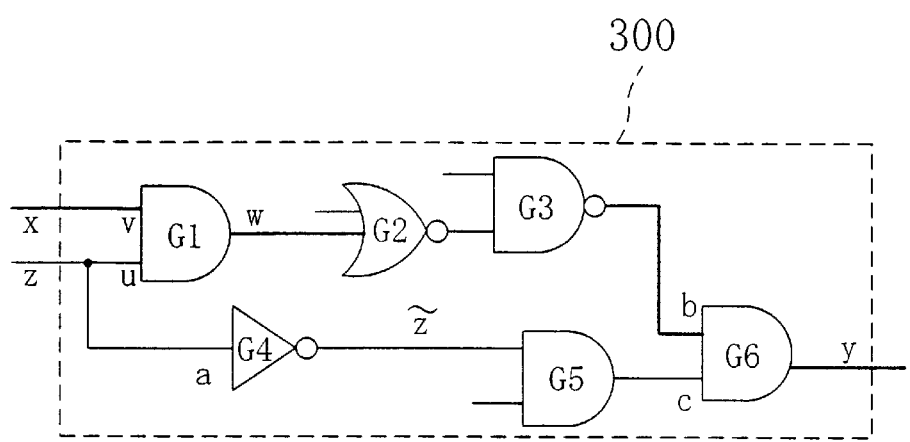
FIG. 11 shows a logic circuit including false paths.

The process of propagating a control signal will be defined for each of the gates. For example, in FIG. 11, when z="1", the output of the inverter G4 is "0", and the output c of the AND gate G5 is "0". Accordingly, z=1 leads to c=0 by the propagation process. As a result, z=0 when c=1. Note that this relation can be obtained by an inverse propagation process.

In order that a non-control signal path is activated in the AND, OR, NAND and NOR gate, all other input signals of the gate must be the non-control signal. In contrast, in order that a control signal path is activated in the AND, OR, NAND and NOR gate, either the non-control signal is transmitted to each input other than the input v corresponding to the path, or the control signal is transmitted to each input other than the input v after it arrives at the input v. This necessitates the use of the delay amount to determine whether the control signal path is activated or not. In contrast, whether the non-control signal path is activated or not can be determined regardless of the time factor, that is, can be determined only from the connection and the gate type.

In the graph G=(V, E), the condition for an edge to be activated, that is, the condition that the non-control signal passes through all other edges coming into w, is given for each edge e=(v, w) within the logic gate through which the non-control signal is transmitted. This is herein referred to as "activating condition of a non-control signal edge e". The condition that the non-control signal s is transmitted to the other edges e'=(u, w) coming into w is denoted by Net(u)=s, where Net(u) is the net (signal) incident to u of G.

If the signal s of Net(u) has fanout other than u, which is transmitted to another logic gate L as a control signal, the output value of the logic gate L is determined by the propagation process. The logic value listed in the activating condition of a non-control signal edge is propagated by the propagation process. For example, in FIG. 11, the activating condition of (v1, w1) in the gate G1 as a first gate is z=1, that is, Net(u)=1, which can be propagated to the input a=1 of the gate G4 and the input c=0 of the gate G6. As described before, z=0 when c=1. Therefore, it can be seen that the activating condition of an edge (b1, y1) in the AND gate G6 as a second gate, that is, c=1, will not be satisfied simultaneously with z=1. In other words, the edges (v1, w1) and (b1, y1) cannot be activated simultaneously. Therefore, each path passing through both edges (v1, w1) and (b1, y1) can be determined as a false path. Such a false path can be specified by a pair of vertices (v1, b1).

Figure 8:
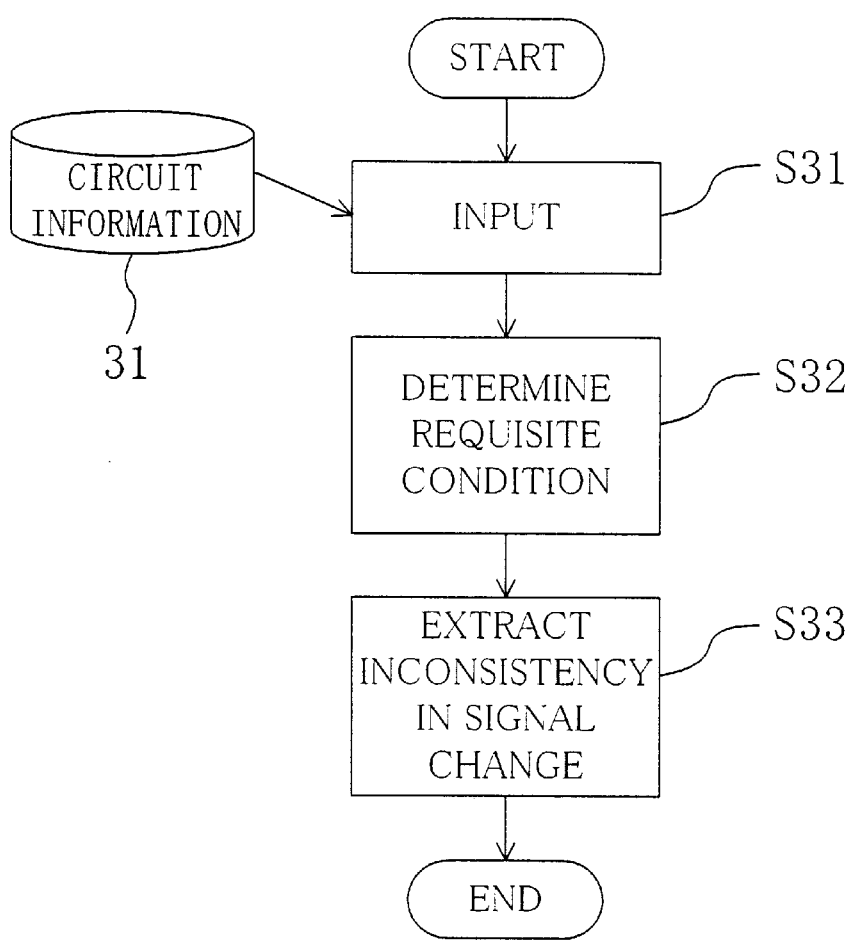
FIG. 8 is a flowchart illustrating a false path extraction method according to a third embodiment of the present invention.
Figure 9:
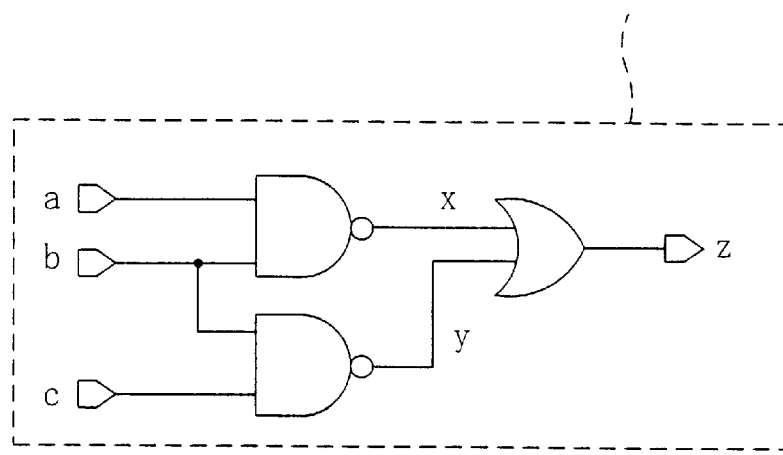
FIG. 9 shows an example of a logic circuit.

FIG. 8 is a flowchart illustrating a false path extraction method according to the third embodiment of the present invention. As shown in FIG. 8, circuit information 31 is first input in step S31. Then, a requisite condition of a signal for activating a non-control signal in each gate is determined in step S 32. Enc=(unc, wnc) denotes an edge in the gate whose input corresponds to a non-control signal ncs, and RE(enc)= [(vnc, wnc) ∈E] denotes a set of edges having the activating condition of Net(u)=ncs. Net(u)=ncs can determine the value of each net by the propagation process.

Thereafter, in step S33, a signal change of the gates that are not simultaneously activated is extracted based on the requisite condition determined in step S32. It is now assumed that the value of an input c of a gate G is a control signal cs of G, and G has an input b in addition to the input C. Provided that an edge in the gate G whose input c corresponds to the control signal ncs is enc'=(cnc, ync), each edge (bnc, ync) in RE(enc')=[(bnc, ync)∈E] has the activating condition of Net(c)=ncs. Therefore, the edges (vnc, wnc) (∈RE(enc)) and (bnc, ync) ((RE(enc')) will not be activated simultaneously. Provided that suc(v) is a set of vertices in the gate G that are accessible from a vertex v through a directed path, a pair of vertices (vnc, bnc) specifies a false path.

Provided that m is the number of edges in a graph, all such pairs of vertices for a single edge enc can be found with time complexity of O(m). Therefore, all the pairs of vertices can be found with time complexity of O(m$^2$).

As has been described above, according to the present invention, delay distribution of an integrated circuit is calculated while taking into account the correlation of performance between interconnects or elements, allowing for improved delay estimation accuracy. This prevents excessive margins in integrated circuit design, enabling reduction in area and power consumption.

Moreover, removing the false paths in evaluation of an integrated circuit allows for reduced time complexity and improved delay estimation accuracy.

What is claimed is:

1. A method for calculating delay distribution in an integrated circuit to be designed, wherein the delay distribution is calculated based on correlation information indicating a correlation of performance between interconnects or elements that are included in the integrated circuit,
said method comprising the steps of:
generating a graph representing the integrated circuit based on circuit information indicating connection between elements in the integrated circuit; and
calculating delay distribution of each vertex in the graph by using performance distribution information and the correlation information, the performance distribution information indicating performance distribution of the interconnects and the elements that are included in the integrated circuit.

2. The method according to claim 1, further comprising the step of producing the correlation information based on layout of the integrated circuit by using correlation characteristics information, the correlation characteristics information indicating a relation between the correlation of performance between the interconnects or the elements and layout characteristics.

3. The method according to claim 2, wherein the correlation characteristics information indicates at least a relation between a distance between the elements and the correlation of performance.

4. The method according to claim 2, wherein the correlation characteristics information indicates at least a relation between orientation of the elements and the correlation of performance.

5. The method according to claim 2, wherein the correlation characteristics information indicates at least a relation between presence/absence or length of a common part of two interconnects and the correlation of performance.

6. The method according to claim 2, further comprising the step of evaluating characteristics of each interconnect or element in an integrated circuit for characteristics evaluation, and producing the correlation characteristics information based on the evaluation result and layout of the integrated circuit for characteristics evaluation.

7. A method for calculating delay distribution in an integrated circuit to be designed, wherein the delay distribution is calculated based on correlation information indicating a correlation of performance between interconnects or elements that are included in the integrated circuit,
said method comprising the steps of:
generating a graph representing the integrated circuit based on circuit information indicating connection between elements in the integrated circuit; and
calculating delay distribution of each vertex in the graph by using performance distribution information and the correlation information, the performance distribution information indicating performance distribution of the interconnects and the elements that are included in the integrated circuit,
wherein the calculation step includes:
a first step of selecting from the graph a vertex that does not belong to a set of vertices whose delay distribution has been calculated as a vertex for calculation, and
a second step of calculating for the vertex selected in the first step the delay distribution and a correlation of performance with each vertex belonging to the set, based on the performance distribution information and the correlation information, and
the first and second steps are repeatedly conducted while adding to the set the vertex whose delay distribution has been calculated.

* * * * *

UNITED STATES PATENT AND TRADEMARK OFFICE
CERTIFICATE OF CORRECTION

PATENT NO. : 6,684,375 B2
DATED : January 27, 2004
INVENTOR(S) : Shuji Tsukiyama et al.

It is certified that error appears in the above-identified patent and that said Letters Patent is hereby corrected as shown below:

Title page,
Item [54], Title, please change the title from "DELAY DISTRUBUTION CALCULATION METHOD, CIRCUIT EVALUATION METHOD AND FALSE PATH EXTRACTION METHOD" to -- DELAY DISTRUBUTION CALCULATION METHOD IN AN INTEGRATED CIRCUIT DESIGN --.

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,684,375 B2
DATED         : January 27, 2004
INVENTOR(S)   : Shuji Tsukiyama et al.

It is certified that error appears in the above-identified patent and that said Letters Patent is hereby corrected as shown below:

<u>Title page, Item [54] and Column 1, lines 1-3,</u>
Title, change "DELAY DISTRIBUTION CALCULATION METHOD, CIRCUIT EVALUATION METHOD AND FALSE PATH EXTRACTION METHOD"
to -- DELAY DISTRIBUTION CALCULATION METHOD IN AN INTEGRATED CIRCUIT DESIGN --.

Signed and Sealed this

Twenty-fifth Day of April, 2006

JON W. DUDAS
*Director of the United States Patent and Trademark Office*